US009426688B2

United States Patent
Aksu et al.

(10) Patent No.: US 9,426,688 B2
(45) Date of Patent: Aug. 23, 2016

(54) DETERMINING A FREQUENCY FOR A CLIENT DEVICE TO USE TO CONNECT TO A NETWORK

(71) Applicants: Verizon Patent and Licensing Inc., Basking Ridge, NJ (US); Cellco Partnership, Basking Ridge, NJ (US)

(72) Inventors: Arda Aksu, Martinez, CA (US); Deepak Kakadia, Antioch, CA (US); Lalit R. Kotecha, San Ramon, CA (US); Donna L. Polehn, Kirkland, WA (US); Patricia Ruey-Jane Chang, San Ramon, CA (US); Mingxing S. Li, San Jose, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 43 days.

(21) Appl. No.: 14/193,290

(22) Filed: Feb. 28, 2014

(65) Prior Publication Data

US 2015/0249989 A1 Sep. 3, 2015

(51) Int. Cl.
*H04W 28/02* (2009.01)
*H04W 72/04* (2009.01)
*H04W 48/18* (2009.01)
*H04W 28/08* (2009.01)
*H04W 28/16* (2009.01)

(52) U.S. Cl.
CPC ...... *H04W 28/0231* (2013.01); *H04W 28/0252* (2013.01); *H04W 72/048* (2013.01); *H04W 28/085* (2013.01); *H04W 28/16* (2013.01); *H04W 48/18* (2013.01); *H04W 72/0453* (2013.01)

(58) Field of Classification Search
CPC .............. H04W 36/0022; H04W 36/0016; H04W 36/06; H04W 36/14; H04W 36/16; H04W 36/165; H04W 36/22; H04W 36/24; H04W 36/245; H04W 28/22; H04W 28/24; H04W 24/02; H04W 24/04; H04W 28/0215; H04W 28/0252; H04W 28/0257; H04W 28/0263; H04W 28/0289; H04W 28/08; H04W 28/085; H04W 28/18; H04W 28/26; H04W 472/0406; H04W 472/044; H04W 472/0453; H04W 472/048; H04W 472/0486; H04W 472/0493; H04W 472/06; H04W 476/021; H04W 476/022
See application file for complete search history.

(56) References Cited

U.S. PATENT DOCUMENTS

| 8,509,802 | B2* | 8/2013 | Li | H04W 72/085 455/226.1 |
|---|---|---|---|---|
| 2009/0270132 | A1* | 10/2009 | Nakayama | H04W 24/04 455/561 |
| 2011/0258214 | A1* | 10/2011 | Shu | H04L 41/0893 707/769 |
| 2012/0122457 | A1* | 5/2012 | Murakami | H04W 36/26 455/436 |

(Continued)

*Primary Examiner* — Olumide T Ajibade Akonai
*Assistant Examiner* — Martin Chang (57) ABSTRACT

A device is configured to obtain network information indicating an amount of client devices, of each device type, registered in an operator network. The device is configured to obtain client device information identifying a client device and determine a device type of the client device based on the client device information. The device is configured to determine a frequency for the client device to use to communicate with the operator network based on the device type of the client device and the amount of client devices of each of the device types registered in the operator network. The device is configured to provide an instruction to the client device to use the frequency to communicate with the operator network.

20 Claims, 7 Drawing Sheets

(56) References Cited

U.S. PATENT DOCUMENTS

| | | | |
|---|---|---|---|
| 2012/0184258 A1* | 7/2012 | Kovvali | H04W 4/18 455/418 |
| 2013/0053080 A1* | 2/2013 | Gebert | H04W 76/02 455/509 |
| 2013/0122921 A1* | 5/2013 | Juppi | H04W 72/04 455/450 |
| 2013/0336153 A1* | 12/2013 | Liang | H04W 24/10 370/252 |
| 2014/0066050 A1* | 3/2014 | Kotecha et al. | 455/422.1 |

* cited by examiner

DETERMINING A FREQUENCY FOR A CLIENT DEVICE TO USE TO CONNECT TO A NETWORK

BACKGROUND

Client devices (e.g., smart phones, tablet computers, etc.) may be capable of connecting to an operator network at different frequencies (e.g., via different bands and/or channels). However, determining which frequency a client device should use to connect to the operator network at any given time may be problematic.

DETAILED DESCRIPTION OF PREFERRED EMBODIMENTS

The following detailed description of example implementations refers to the accompanying drawings. The same reference numbers in different drawings may identify the same or similar elements.

Client devices may connect to an operator network via a base station using a certain frequency. The operator network may select a different frequency based on load balancing the loads at different frequencies. For example, if a frequency has a high load, the operator network may move client devices off that frequency and onto another frequency with a lower load. However, such load balancing may not be the most effective way of determining a frequency for a client to use. In implementations described herein, a frequency for a client device to use to communicate may be determined based on the device type of the client device and the device types of other client devices registered in the operator network. Additionally, or alternatively, the frequency may be determined based on which frequencies the client device supports and which frequencies other client devices registered in the operator network support.

Figure 1:
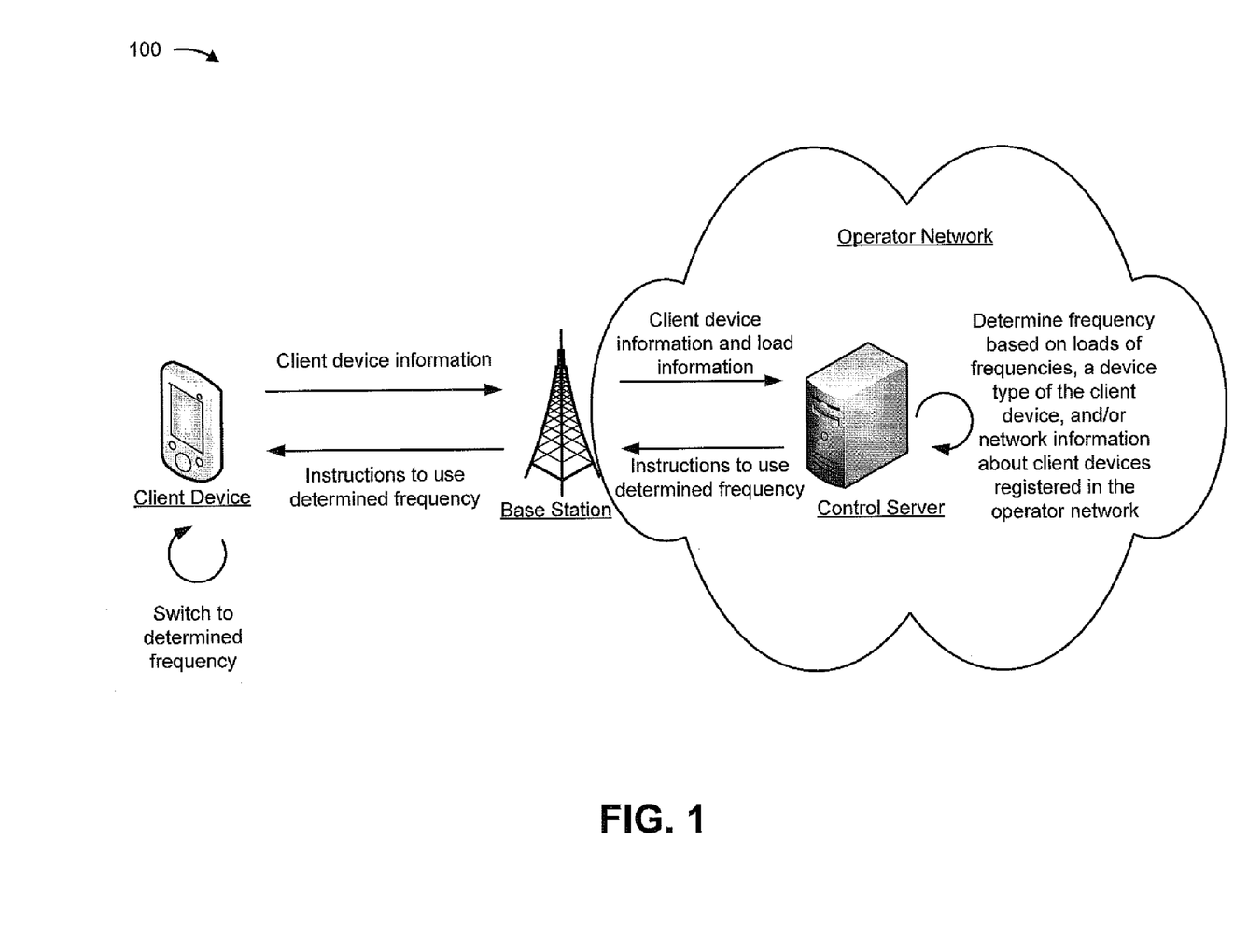
FIG. 1 is a diagram of an overview of an example implementation described herein.

FIG. 1 is a diagram of an overview of an example implementation 100 described herein. In example implementation 100, a client device (e.g., a smart phone, a tablet computer, etc.) may connect to a base station at an initial frequency. The base station may transmit a message to an operator network indicating that the client device is connected at the initial frequency and indicating client device information about the client device (e.g., a client device identifier (ID)). The operator network may receive the message and transmit the message to a control server included in (or associated with) the operator network.

The control server may receive the message and load information indicating loads at different frequencies. The control server may also store network information about client devices and/or device types registered in the operator network, connected to the operator network, and or active in the operator network. For example, the network information may indicate data usage of device types and/or amount of client devices that support certain frequencies. Based on the client device information for the client device, the control server may determine a device type of the client device and/or which frequencies the client device is capable of using. Based on the device type of the client device, the frequencies the client device is capable of using, the network information, and/or the load information, control server may determine a frequency for the client device to use. In some implementations, the determined frequency may not be a frequency with the lowest load among the possible frequencies.

The control server may generate instructions for the client device to use the determined frequency. The control server may transmit the instructions to the client device via the base station. The client device may receive the instructions and switch to the determined frequency based on the instructions.

In this way, the control server may determine an optimal frequency for the client device to use and not merely select a frequency with the lowest load.

Figure 2:
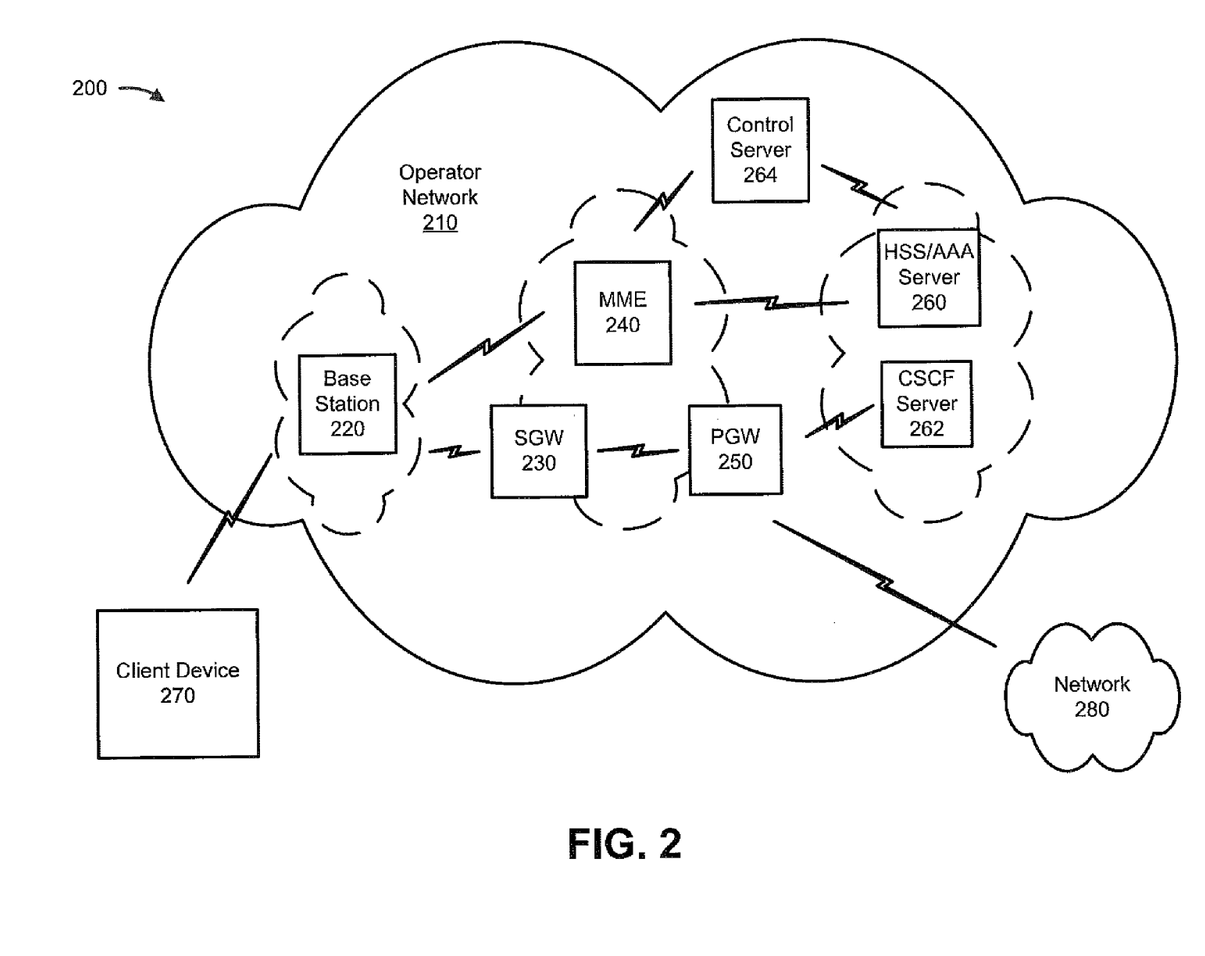
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an operator network 210. Operator network 210 may include a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/authentication, authorization, accounting (AAA) server 260 (hereinafter referred to as "HSS/AAA server 260"), a call session control function (CSCF) server 262 (hereinafter referred to as "CSCF server 262"), and a control server 264. Environment 200 may also include a client device 270 and a network 280.

Operator network 210 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which client device 270 communicates with the EPC. The EPC may include SGW 230, MME 240, and/or PGW 250 that enables client device 270 to communicate with network 280 and/or an Internet protocol (IP) multimedia subsystem (IMS) core. The IMS core may include HSS/AAA server 260 and/or CSCF server 262 and may manage certain information and services, such as authentication, session initiation, account information, and/or a user profile, associated with client device 270. The LTE network may include multiple base stations 220, and the EPC may include multiple SGWs 230, MMEs 240, and/or PGWs 250. Additionally, or alternatively, operator network 210 may include a cellular network, a public land mobile network (PLMN), a second generation (2G) network, a third generation (3G) network, a fourth generation (4G) network, a fifth generation (5G) network, and/or another type of network.

Base station 220 may include one or more network devices that receive, process, and/or transmit traffic, such as audio, video, text, and/or other data, destined for and/or received from client device 270. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from client device 270 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-base station handovers, and may act as an anchor for mobility between LTE and other 3GPP technologies.

MME 240 may include one or more computation or communication devices that gather, process, search, store, and/or provide information in a manner described herein. For example, MME 240 may perform operations associated with a handoff to and/or from the EPS. MME 240 may perform operations to register a client device 270 with the EPS, to handoff client device 270 from the EPS to another network, to handoff client device 270 from the other network to the EPS, and/or to perform other operations. MME 240 may perform policing operations for traffic destined for and/or received from client device 270.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of client device 270 to external packet data networks by being a traffic exit/entry point for a client device 270. PGW 250 may perform policy enforcement, packet filtering, charging support, lawful intercept, and packet screening. PGW 250 may also act as an anchor for mobility between 3GPP and non-3GPP technologies. PGW 250 may authenticate a client device 270 (e.g., via interaction with HSS/AAA server 260).

HSS/AAA server 260 may include one or more server devices, or other types of computation or communication devices, that gather, process, search, store, and/or provide information in a manner described herein. For example, HSS/AAA server 260 may manage, update, and/or store, in a memory associated with HSS/AAA server 260, profile information associated with a client device 270 that identifies applications and/or services that are permitted for and/or accessible by client device 270, bandwidth or data rate thresholds associated with the applications or services, information associated with a user of client device 270 (e.g., a username, a password, a personal identification number (PIN), etc.), a data plan, rate information, minutes allowed, and/or other information. Additionally, or alternatively, HSS/AAA server 260 may include a device that performs authentication, authorization, and/or accounting (AAA) operations associated with a communication session with a client device 270. With regard to the authentication operation, HSS/AAA server 260 may verify a device's (e.g., client device 270) specific digital identity provided via an identifier (e.g., a password, a digital certificate, a phone number, etc.) associated with the device. With regard to the authorization function, HSS/AAA server 260 may grant or refuse privileges to a device (e.g., client device 270) for accessing specific services (e.g., IP address filtering, address assignment, route assignment, quality of service (QoS), etc.). With regard to the accounting operation, HSS/AAA server 260 may track consumption of network resources (e.g., by client device 270) and may use this information for management, planning, billing, etc.

CSCF server 262 may include one or more server devices, or other types of computation or communication devices, that gather, process, search, store, and/or provide information in a manner described herein. CSCF server 262 may process and/or route calls to and from client device 270 via the EPC. For example, CSCF server 262 may process calls, received from network 280, that are destined for client device 270. In another example, CSCF server 262 may process calls, received from client device 270, that are destined for network 280.

CSCF server 262 may also include a policy and charging rules function (PCRF) that may perform operations that enforce EPS policies associated with a communication session with a client device 270. For example, the PCRF may dynamically provide real-time bandwidth allocations and/or controls (e.g., associated with a particular access point name (APN)) associated with particular applications, network accesses, and/or services provided to client device 270 during a communication session. The PCRF may also dynamically provide a real-time signal flow policy to adapt to changing conditions within the network and/or to manage traffic flow during the communication session.

Control server 264 may include one or more devices capable of processing, storing, and/or routing information. In some implementations, control server 264 may include a communication interface that allows control server 264 to receive information from and/or transmit information to other devices in environment 200. For example, control server 240 may receive information from MME 240 indicating when client device 270 connects to base station 220. Additionally, or alternatively, control server 264 may communicate with HSS/AAA server 260 to obtain information stored in a memory of HSS/AAA server 260.

Client device 270 may include any computation or communication device, such as a communication device that is capable of communicating with a network (e.g., network 280) and/or an operator network (e.g., operator network 210). For example, client device 270 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a server, a camera, a gaming device, or another mobile, computation, or communication device. In some implementations, client device 270 may be a M2M device.

Network 280 may include one or more wired and/or wireless networks. For example, network 280 may include a cellular network, a PLMN, a 2G network, a 3G network, a 4G network, a 5G network, and/or another network. Additionally, or alternatively, network 280 may include a wide area network (WAN), a metropolitan network (MAN), a telephone network (e.g., the Public Switched Telephone Network (PSTN)), an ad hoc network, an intranet, the Internet, a fiber optic-based network, and/or combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, control server 264 may be included in base station 220. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
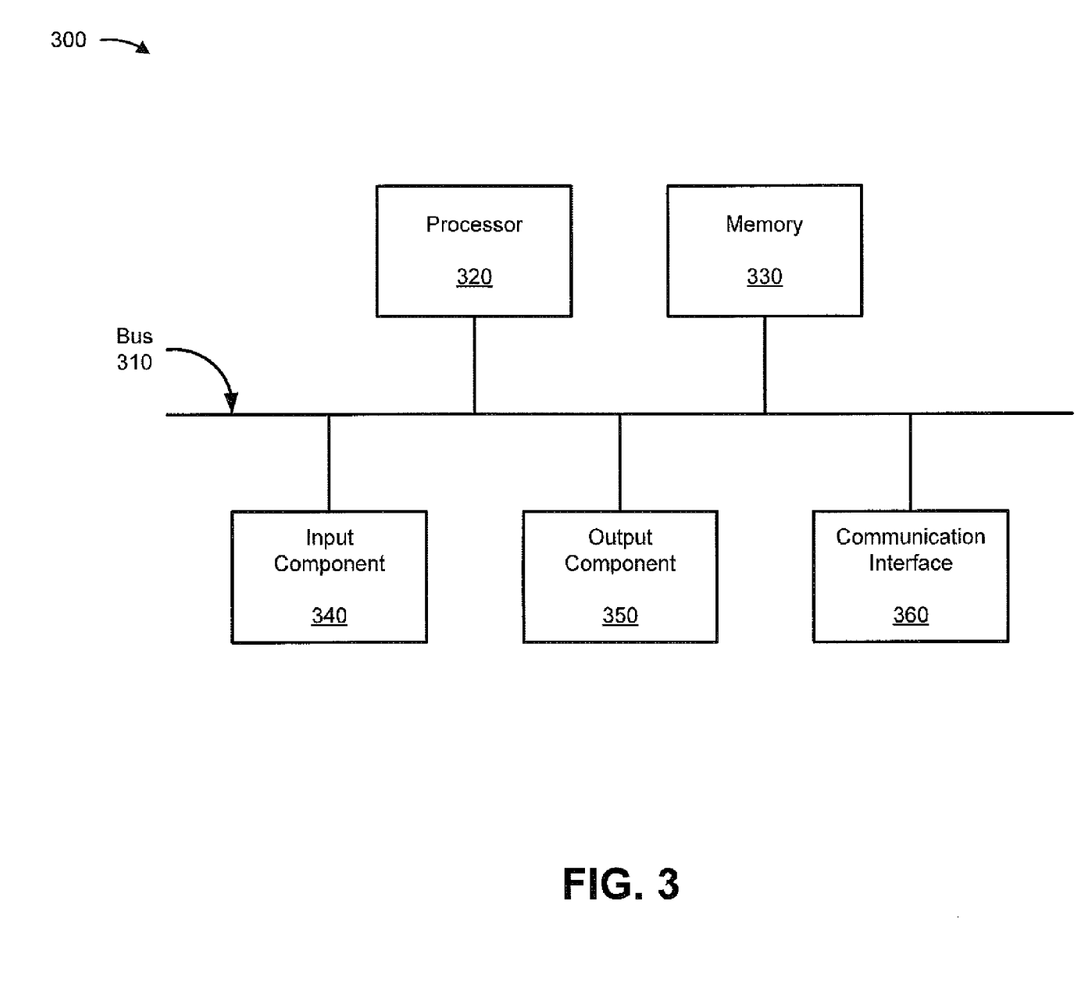
FIG. 3 is a diagram of example components of a device that corresponds to one or more devices of FIG. 2.

FIG. 3 is a diagram of example components of a device 300. Device 300 may correspond to base station 220, SGW 230, MME 240, PGW 250, HSS/AAA server 260, CSCF server 262, control server 264, and/or client device 270. Alternatively, or additionally, each of base station 220, SGW 230, MME 240, PGW 250, HSS/AAA server 260, CSCF server 262, control server 264, and/or client device 270 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic that interpret and execute instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with operator network 210, devices connected to operator network 201, network 280, and/or devices connected to network 280.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
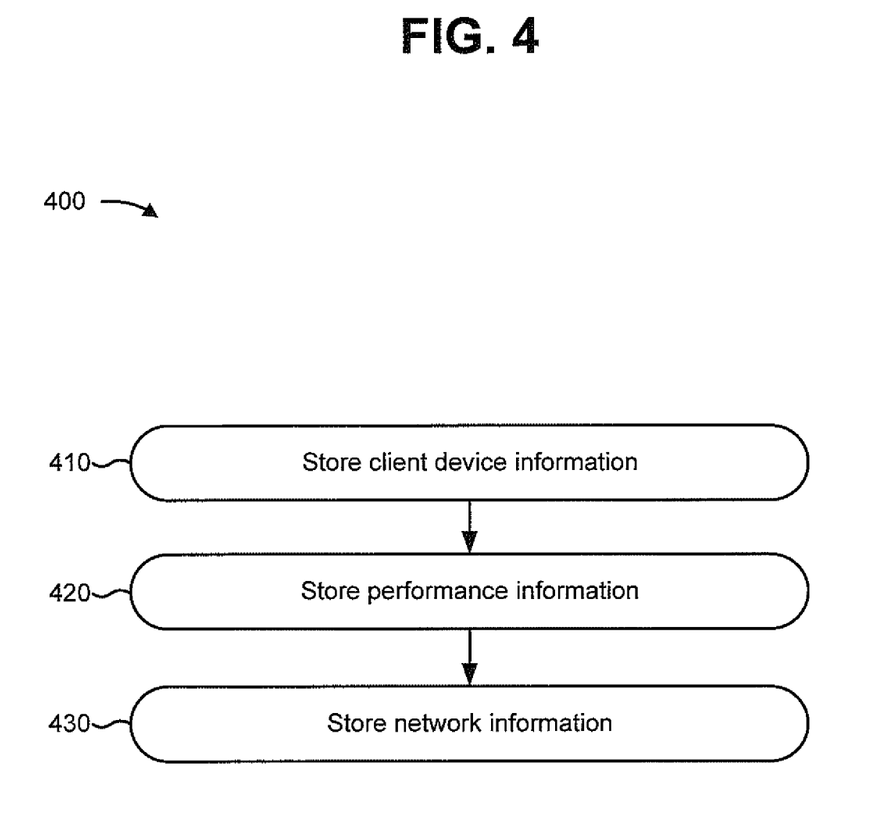
FIG. 4 is a flowchart of an example process for storing information about an operator network.

FIG. 4 is a flowchart of an example process 400 for storing information about operator network 210. In some implementations, one or more process blocks of FIG. 4 may be performed by control server 264. Additionally, or alternatively, one or more process blocks of FIG. 4 may be performed by another device or a group of devices separate from or including control server 264.

As shown in FIG. 4, process 400 may include storing client device information (block 410). For example, control server 264 may store the client device information.

In some implementations, operator network 210 may store client device information for each client device 270 registered with operator network 210. For example, HSS/AAA server 260 may store the client device information in a memory associated with HSS/AAA server 260. HSS/AAA server 260 may send the client device information to control server 264. Control server 264 may receive the client device information and store the client device information in a memory of control server 264.

The client device information may include a client device ID. For example, the client device ID may include a phone number, an IP address, an international mobile subscriber identity ("IMSI"), an international mobile station equipment identify ("IMEI"), a mobile equipment identifier ("MEID"), or the like.

The client device information may include device type information indicating a device type of client device 270. For example, the device type may indicate a kind of client device 270 (e.g., a M2M device, a smart phone, a tablet computer, a desktop computer, etc.). In some implementations, the device type may indicate an operating system used by the client device 270. Additionally, or alternatively, the device type may indicate a make and/or model of client device 270.

The client device information may include data usage information indicating data usage for client device 270. For example, the data usage information may indicate an amount of data used by client device 270 over a time period (e.g., megabytes per month, gigabytes per month, etc.), when client device 270 uses data and how much data (e.g., how much data client device 270 uses every day at a certain time), and/or how often client device 270 switches between an active state and an idle state.

The client device information may include capability information indicating which frequencies, channels, and/or bands client device 270 is capable of using to communicate with base station 220.

As further shown in FIG. 4, process 400 may include storing performance information (block 420). For example, control server 264 may store the performance information.

An operator of operator network 210 may certify a make and/or a model of client device 270 before client devices 270 of that make and/or model are authorized to connect to operator network 210. During the certification process, the operator may test a client device 270 of the make and/or model and record information about the make and/or model's performance. For example, the operator may record performance information about the communication performance (e.g., throughput) of the make and/or model at different frequencies. For each make and/or model, the performance information may indicate preferred frequencies to use for communication, an order of best performing frequencies, frequencies that should not be used for communication, and/or frequencies to try to avoid using for communication. Additionally, or alternatively, operator network 210 may associate performance information with an operating system used by client device 270.

The operator may input the performance information for each make, model, and/or operating system into a memory associated with operator network 210, and the memory may store the performance information. Operator network 210 may send the performance information to control server 264. Control server 264 may receive the performance information and store the performance information.

As further shown in FIG. 4, process 400 may include storing network information (block 430). For example, control server 264 may store the network information.

The network information may include statistics about client devices 270 registered in operator network 210. Control server 264 may calculate the statistics based on the obtained client device information and store the statistics as the network information in a memory of control server 264. Additionally, or alternatively, another device in environment 200 may calculate the statistics, generate the network information, and send the network information to control server 264. Control server 264 may receive the network information sent from the other device and store the network information in a memory of control server 264.

The network information may indicate which device types are registered in operator network 210, a quantity of client devices 270 of each device type registered in operator network 210, and/or a percentage of client devices 270 of each device type registered in operator network 210 of a total number of client devices 270 registered in operator network 210 (e.g., 50% smart phones, 30% tablets, 20% M2M devices). For each device type, the network information may indicate an amount of data used by client devices 270 of the device type (e.g., an average amount of data used by a client device 270 of the device type).

The network information may indicate which frequencies and/or bands client devices 270 registered in operator network 210 are capable of using. For each frequency and/or band, the performance information may indicate a quantity of client device 270 registered in operator network 210 that are capable of using the frequency, and/or a percentage of total client devices 270 registered in operator network 210 that are capable of using the frequency.

The statistics included in the network information may be calculated based on client devices 270 registered in operator network 210 globally, nationally, and/or regionally.

While a series of blocks has been described with regard to FIG. 4, the blocks and/or the order of the blocks may be modified in some implementations. Additionally, or alternatively, non-dependent blocks may be performed in parallel.

Figure 5:
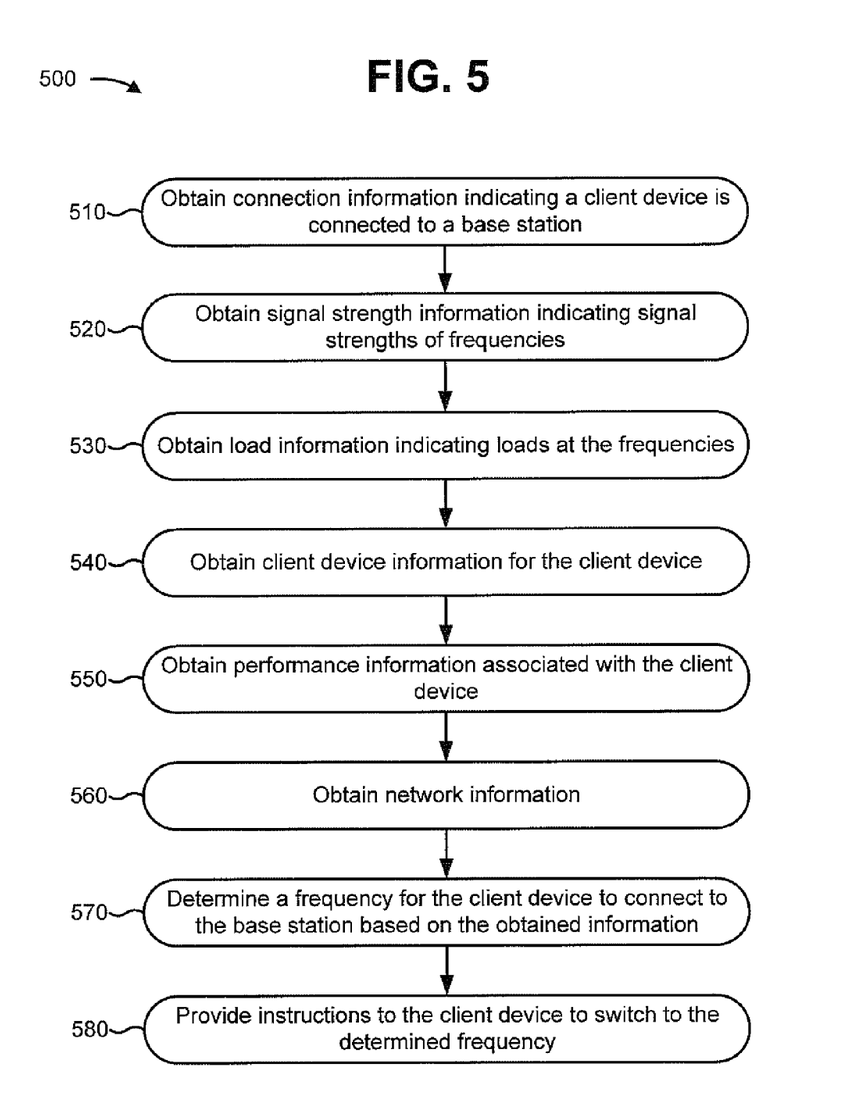
FIG. 5 is a flowchart of an example process for determining a frequency for a client device to use to communicate with the operator network.

FIG. 5 is a flowchart of an example process 500 for determining a frequency for client device 270 to use to communicate with operator network 210. In some implementations, one or more process blocks of FIG. 5 may be performed by control server 264. Additionally, or alternatively, one or more process blocks of FIG. 5 may be performed by another device or a group of devices separate from or including control server 264.

As shown in FIG. 5, process 500 may include obtaining connection information indicating client device 270 is connected to base station 220 (block 510). For example, control server 264 may obtain the connection information.

Client device 270 may connect to base station 220 at an initial frequency. The initial frequency may be a default frequency and/or a previous frequency client device 270 used to connect to a base station 220. Base station 220 may send MME 240 a message indicating that client device 270 is connected to base station 220 and/or that client device 270 is attempting to connect to operator network 210. MME 240 may receive the message and send connection information to control server 264. Control server 264 may receive the connection information.

The connection information may indicate the initial frequency, a client device ID for client device 270, and/or a QoS level associated with the connection between client device 270 and base station 220.

As further shown in FIG. 5, process 500 may include obtaining signal strength information indicating signal strengths of frequencies (block 520). For example, control server 264 may obtain the signal strength information.

Client device 270 and/or base station 220 may measure signal strengths of different frequencies. Client device 270 and/or base station 220 may transmit signal strength information indicating the signal strengths of different frequencies to control server 264. Control server 264 may receive the signal strength information.

As further shown in FIG. 5, process 500 may include obtaining load information indicating loads at different frequencies (block 530). For example, control server 264 may obtain the load information.

Operator network 210 may determine the load at different frequencies. For example, base station 220 and/or MME 240 may calculate how many client devices 270 are connected to base station 220 at certain frequencies and how much data is being communicated over the frequencies. Operator network 210 may generate load information indicating the load at the different frequencies and send the load information to control server 264. Control server 264 may receive the load information.

As further shown in FIG. 5, process 500 may include obtaining client device information for client device 270 (block 540). For example, control server 264 may obtain the client device information for client device 270.

Control server 264 may obtain the client device ID from the connection information. Control server 264 may query the client device information that is stored by control server 264 and/or another device in operator network 210 using the client device ID, and obtain client device information associated with the client device ID. For example, the client device information associated with client device 270 may include the device type information, the data usage information, and/or the capability information for client device 270.

As further shown in FIG. 5, process 500 may include obtaining performance information associated with client device 270 (block 550). For example, control server 264 may obtain the performance information.

Control server 264 may obtain the device type of client device 270 from the client device information. Control server 264 may query the performance information that is stored by control server 264 and/or another device in operator network 210 for device types registered in operator network 210, and obtain performance information associated with the device type of client device 270. For example, the performance information associated with the device type may indicate frequencies client device 270 should not use to communicate.

As further shown in FIG. 5, process 500 may include obtaining network information (block 560). For example, control server 264 may obtain the network information.

Control server 264 may obtain the network information from the memory of control server 264 and/or another device in operator network 210.

The network information may indicate what device types are registered in operator network 210, a quantity of client devices 270 of each device type registered in operator network 210, and/or a percentage of client devices 270 of each device type registered in operator network 210 of a total number of client devices 270 registered in operator network 210. For each device type, the network information may indicate an amount of data used by client devices 270 of the device type.

The network information may indicate which frequencies and/or bands client devices 270 registered in operator network 210 are capable of using. For each frequency and/or band, the network information may indicate a quantity of client devices 270 registered in operator network 210 that are capable of using the frequency, and/or a percentage of total client devices 270 registered in operator network 210 that are capable of using the frequency.

As further shown in FIG. 5, process 500 may include determining a frequency for client device 270 to use to connect to base station 220 based on the connection information, the signal strength information, the load information, the client device information, the performance information, and/or the network information (block 570). For example, control server 264 may determine the frequency.

In some implementations, control server 264 may determine a frequency based on data usage for the device type of client device 270 and/or a load of the frequency. For example, the network information may indicate data usage for each device type. The data usage may include an amount of data used by each device type (e.g., an average amount of data used and/or how often each device type switches between active and idle states). Based on the network information, control server 264 may predict future data usage for client devices 270 of each device type.

For example, some device types may be predicted to use more data than other device types. Control server 264 may predict a first device type (e.g., a tablet computer) will use more data than a second device type (e.g., a smart phone) based on the first device type using more data in the past. Control server 264 may determine a device type that uses less data than another device type should use a frequency with a greater load than other frequencies, and frequencies with lesser loads should be reserved for device types that use more data. Conversely, control server 264 may determine a device type, that uses more data than another device type, should use a frequency with a lesser load than other frequencies. Accordingly, control server 264 may determine the frequency based on the amount of data used for the device type and the loads of the frequencies.

Additionally, or alternatively, some device types may be predicted to switch between active an idle states more often than other device types. Control server 264 may predict a first device type (e.g., a M2M device) will switch between active and idle states more often that a second device type (e.g., a smart phone) based on past patterns indicated in the network information and/or the client device information. Control server 264 may determine a device type that switches more often than other device types should use a frequency having a less loaded signaling channel than another frequency to handle the switching. Conversely, control server 264 may determine a device type that switches less often than other device types should use a frequency having a more loaded signaling channel than another frequency.

Additionally or alternatively, control server 264 may determine the frequency based on the quantity of client devices 270 of each device type registered in operator network 210. The network information may indicate a percentage of client devices 270 of each device type registered in operator network 210. In some implementations, control server 264 may predict a device type of a next client device 270 that will connect to base station 220 based on the network information and determine a frequency that the current client device 270, attempting to connect to operator network 210, should use based on the predicted device type of the next client device 270. Control server 264 may determine the frequency based on the predicted device type of the next client device 270 to connect to base station 220.

For example, assume a first device type makes up X % of client devices 270 registered in operator network 210 and the first device type has a high average data usage. Further, assume a second device type makes up Y % of client devices 270 registered in operator network 210 and the second device type has a low average data usage (relative to the first device type). If a client device 270 of the second device type connects to base station 220, control server 264 may predict that the next client device 270 to connect will be of the first device type if X % is greater than Y %. Control server 264 may determine that that the predicted client device 270 of the first device type will use more data than client device 270 of the second device type currently connected to base station 220. Thus, control server 264 may determine the frequency for the client device 270 currently connected to base station 220 to be a frequency with a greater load than other frequencies because the next client device 270 may need a frequency with a lesser load. On the other hand, if Y % is greater than X %, control server 264 may predict that the next client device 270 to connect will be of the second device type. Control server 264 may determine the predicted next client device 270 of the second device type will use the same or a similar amount of data as client device 270 of the second device type currently connected to base station 220. Thus, control server 264 may determine the frequency for the client device 270 currently connected to base station 220 to be a frequency with a lesser load than other frequencies.

In some implementations, control server 264 may group client devices 270 together based on data usage in addition to, or alternatively to, grouping client devices 270 based on a device type. For example, a group may include client devices 270 that use the same or similar amounts of data and/or switch between active and idle states at the same or similar rates. Each group may include client devices 270 of different device types. Accordingly, control server 264 may determine the frequency based on the group to which client device 270 belongs.

Additionally, or alternatively, control server 264 may determine the frequency based on the data usage for the specific client device 270 connected to base station 220. For example, control server 264 may predict data usage for client device 270 compared to other client devices 270 in the network based on the network information. If the data usage for client device 270 is low compared to other client devices 270, control server 264 may determine client device 270 should use a frequency with a greater load than other frequencies, and the frequencies with lesser loads should be reserved for client devices 270 that use more data. Conversely, if the data usage for client device 270 is high compared to other client devices 270, control server 264 may determine client device 270 should use a frequency with a lesser load than other frequencies.

In some implementations, control server 264 may determine the frequency based on which frequencies the client device 270 connected to base station 220 supports and which frequencies other client devices 270 registered in operator network 210 support. The client device information obtained for client device 270 may indicate which frequencies client device 270 is capable of using. The obtained network information may indicate an amount (e.g., a quantity and/or a percentage) of client devices 270 registered in operator network 210 that are capable of using each frequency. Control server 264 may determine, from among the frequencies supported by client device 270, an amount of client devices 270 registered in operator network 210 that support each frequency. Control server 264 may determine that client device 270 should use a frequency supported by fewer client devices 270 to free up the frequencies supported by more client devices 270. For example, first client devices 270 may only support a first frequency and second client devices 270 may support the first frequency and a second frequency. When possible, control server 264 may instruct the second client devices 270 to use the second frequency to reserve the first frequency for the first client devices 270 that are only capable of using the first frequency.

In some implementations, control server 264 may determine a frequency based on the performance information. The performance information associated with the device type of client device 270 may indicate frequencies client device 270 should not use to communicate and/or frequencies that client device 270 should avoid using. Accordingly, if the performance information indicates client device 270 should not use a frequency and/or avoid a frequency, control server 264 may select a different frequency for client device 270 to use.

In some implementations, control server 264 may determine a frequency based on signal strengths of frequencies indicated by the signal strength information. Control server 264 may select a frequency with a signal strength that satisfies a threshold and/or not select a frequency with a signal strength that does not satisfy the threshold.

In some implementations, control server 264 may receive signal strength information indicating signal strengths of signals sent from multiple base stations 220 that are received by client device 270. In other words, the signal strength of a signal sent from a first base station 220 and received by client device 270 may be known and the signal strength of a signal at the same frequency sent from a second base station 220 may be known. Control server 264 may select a frequency that has a stronger signal strength from the base station 220 to which client device 270 is connected than from another base station 220. For example, if control server 264 selects a frequency that has a weaker signal strength from the base station 220 to which client device 270 is connected, client device 270 may be forced to connect to another base station 220 where the signal strength at the frequency is stronger, which may not be desirable. On the other hand, it may be desirable to force client device 270 off of the base station 220 that client device 270 is currently connected to reduce a load on that base station 220. Accordingly, control server 264 may select a frequency that has a weaker signal strength from the base station 220 that client device 270 is connected.

In some implementations, control server 264 may determine the frequency based on the QoS level of the data being communicated between client device 270 and base station 220. The QoS level may indicate a type of communication between client device 270 and base station 220. The performance information may indicate certain frequencies for certain device types have higher throughput for certain QoS levels or types of communication. Accordingly, control server 264 may determine the frequency based on the QoS level and/or the performance information.

In some implementations, control server 264 may determine the frequency when client device 270 initially connects to base station 220 and/or periodically during the connection to base station 220. If control server 264 determines the frequency during the connection, control server 264 may determine whether to switch the frequency based on the QoS of the data and/or an active or idle state of client device 270. For example, if the QoS level satisfies a threshold, control server 264 may determine not to switch the frequency client device 270 uses so as not to interrupt the communication.

Various factors have been discussed that may be the basis for determining the frequency. Control server 264 may determine the frequency based on these factors individually or a combination of these factors. In some implementations, a score may be generated for each factor. The scores for each factor may be weighted and combined to determine a total score for each frequency client device 270 supports. Control server 264 may determine the frequency based on the total score for each frequency.

Furthermore, when determining the frequency based on network information about client devices 270 registered in operator network 210, control server 264 may use information about client devices 270 registered in operator network 210 globally, nationally, and/or regionally (e.g., a region including the base station 220 connected to client device 270).

As further shown in FIG. 5, process 500 may include providing instructions to client device 270 to switch to the determined frequency (block 580). For example, control server 264 may provide the instructions to client device 270.

Control server 264 may generate instructions for client device 270 to adjust settings to connect to base station 220 at the determined frequency. Control server 264 may send the instructions to client device 270 via base station 220. Client device 270 may receive the instructions and adjust the settings to use the determined frequency based on the instructions. Client device 270 may connect to base station 220 using the determined frequency.

In some implementations, control server 264 may generate an algorithm for determining the frequency based on the client device information for the client devices 270 registered in operator network 210, the performance information, and/or the network information. The algorithm may require inputs of the client device information for the client device 270 connected to base station 220, the signal strength information, the connection information, and/or the load information. Control server 264 may transmit the algorithm to base station 220. Base station 220 may receive the algorithm and store the algorithm. When client device 270 connects to base station 220, base station 220 may obtain the inputs of the client device information for the client device 270 connected to base station 220, the signal strength information, the connection information, and/or the load information. Based on the inputs and the algorithm provided by control server 264, base station 220 may determine a frequency client device 270 should use to connect to base station 220. Base station 220 may generate instructions for client device 270 to use the determined frequency and transmit the instructions to client device 270.

While a series of blocks has been described with regard to FIG. 5, the blocks and/or the order of the blocks may be modified in some implementations. Additionally, or alternatively, non-dependent blocks may be performed in parallel.

Figure 6:
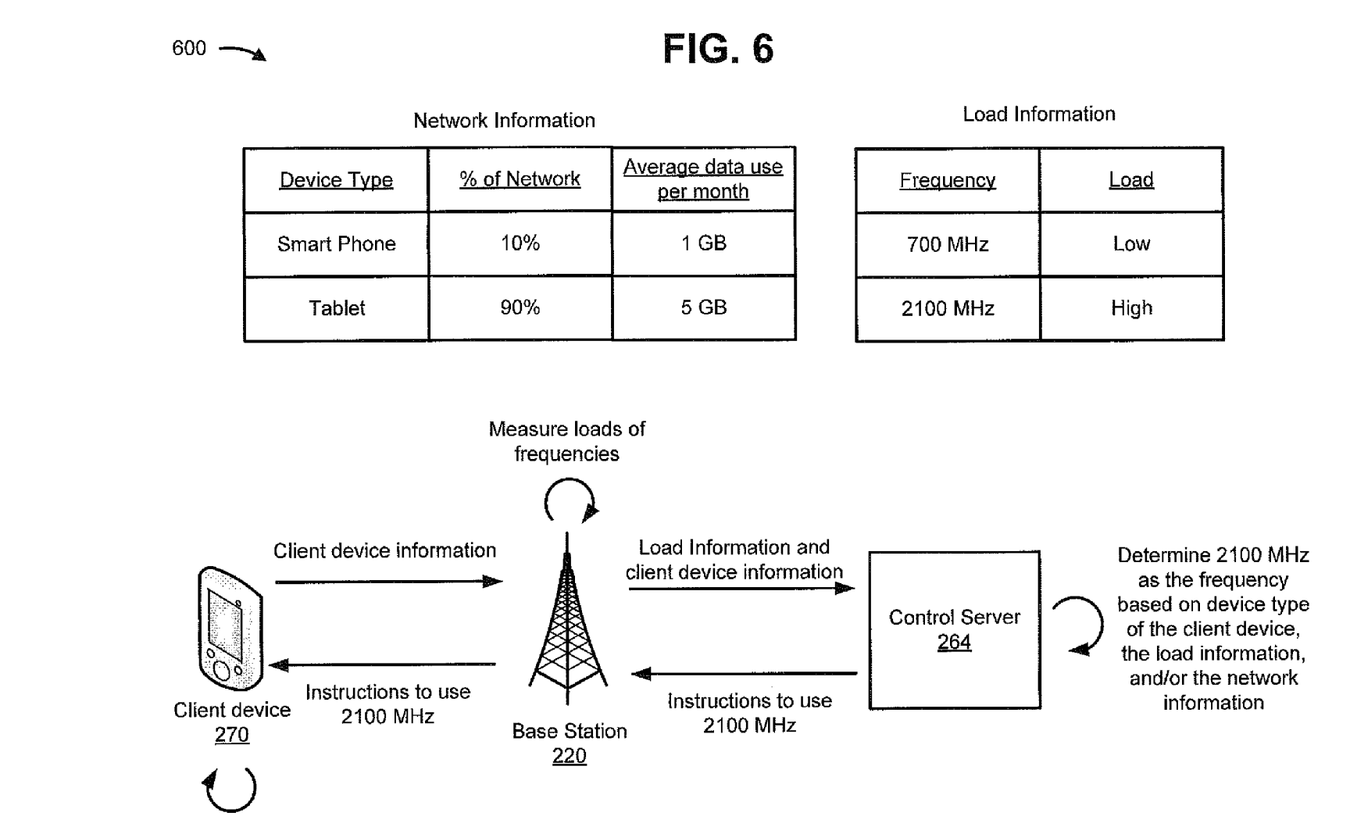
FIG. 6 is a diagram of an example implementation relating to the example process shown in FIG. 5.

FIG. 6 is a diagram of an example implementation 600 relating to process 500 shown in FIG. 5. In example implementation 600, control server 264 may determine a frequency for client device 270 to use based on a device type of client device 270.

As shown in FIG. 6, client device 270 may connect to base station 220 (e.g., using a frequency of 700 MHz). Client device 270 may transmit client device information indicating that client device 270 is a smart phone to base station 220 and base station 220 may receive the client device information. Base station 220 and/or other devices in operator network 210 may measure the loads of frequencies. Assume the load information indicates that a load for 700 MHz is low (e.g., less than a first threshold) and a load for 2100 MHz is high (e.g., greater than a second threshold).

Base station 220 and/or other devices may transmit the load information and the client device information to control server 264. Control server 264 may receive the client device information and the load information. Control server 264 may determine a device type of client device 270 is a smart phone based on the client device information. Control server 264 may also store network information indicating that smart phones make up 10% of client devices 270 registered in operator network 210 and that smart phones use an average of 1 GB of data per month. The network information may also indicate that tablet computers make up 90% of devices registered in operator network 210 and that tablet computers use an average of 5 GB of data a month.

Control server 264 may determine client device 270 should use 2100 MHz to reserve the 700 MHz frequency for tablets that may connect in the future. The probability of a tablet computer connecting next may be greater than a smart phone connecting next because there are nine times more tablet computers registered in operator network 210 than smart phones. Moreover, tablet computers may use five times more data than smart phones and may need to use a frequency with a lesser load. Accordingly, control server 264 may determine that optimal frequency for client device 270 (e.g., a smart phone) is the highly loaded 2100 MHz given the makeup of client devices 270 in operator network 210.

Control server 264 may generate instructions instructing client device 270 to use 2100 MHz. Control server 264 may transmit the instructions to client device 270 via base station 220. Client device 270 may receive the instructions and switch to using 2100 MHz.

Figure 7:
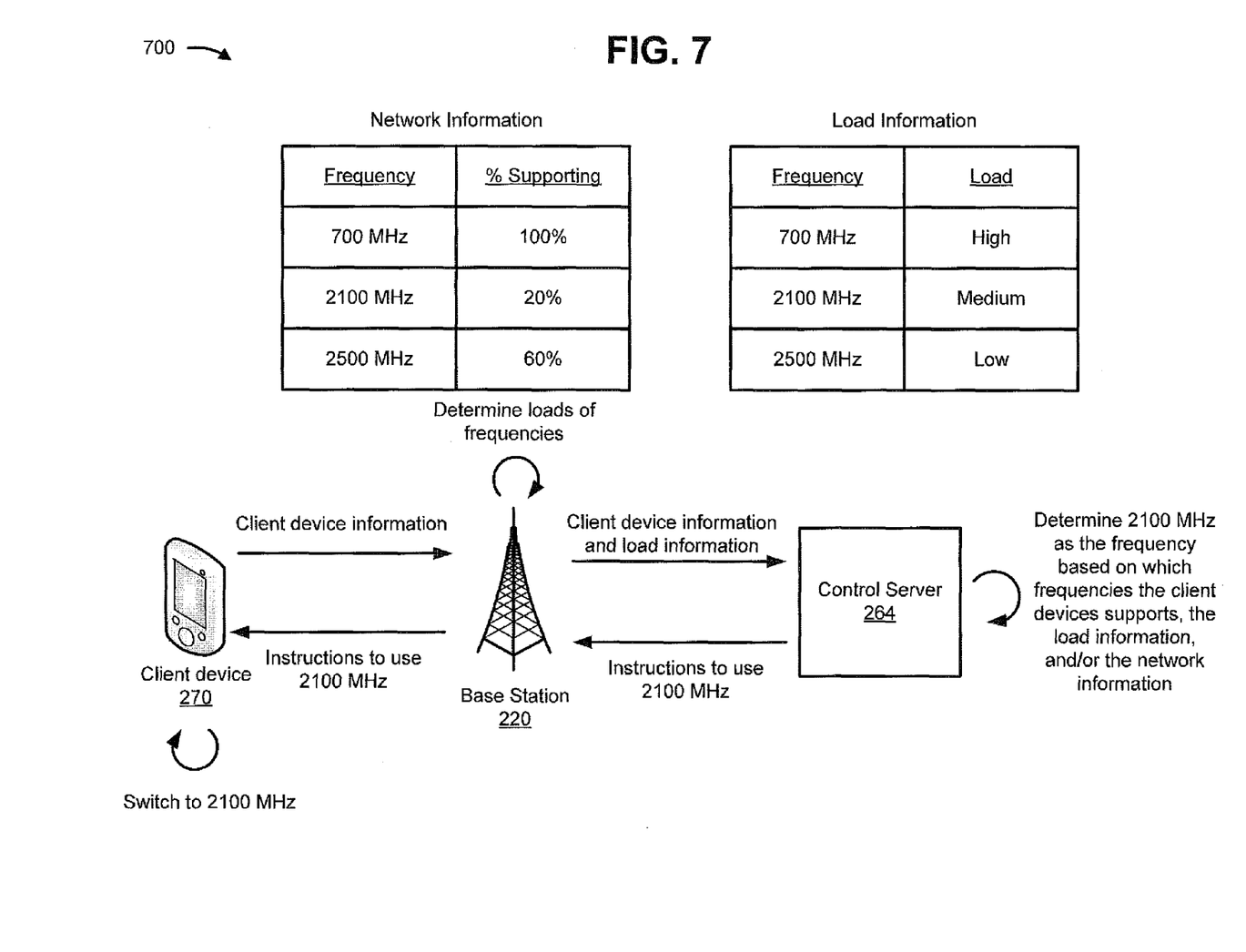
FIG. 7 is a diagram of an example implementation relating to the example process shown in FIG. 5.

FIG. 7 is a diagram of an example implementation 700 relating to process 500 shown in FIG. 5. In example implementation 700, control server 264 may determine a frequency for client device 270 to use based on frequencies supported by other client devices 270 registered in operator network 210.

As shown in FIG. 7, client device 270 may connect to base station 220 (e.g., using a frequency of 700 MHz). Client device 270 may transmit client device information indicating that client device 270 is capable of using 700 MHz, 2100 MHz, and 2500 MHz, and base station 220 may receive the client device information. Base station 220 and/or other devices in operator network 210 may measure the loads of frequencies. Assume the load information indicates that a load for 700 MHz is high, a load for 2100 MHz is medium, and a load for 2500 MHz is low.

Base station 220 and/or other devices may transmit the load information and the client device information to control server 264. Control server 264 may receive the client device information and the load information. Control server 264 may determine which frequencies client device 270 supports based on the client device information. Control server 264 may also store network information indicating that 100% of client devices 270, registered in operator network 210, support 700 MHz; 20% of client devices 270, registered in operator network 210, support 2100 MHz; and 60% of client devices 270, registered in operator network 210, support 2500 MHz.

Control server 264 may determine client device 270 should use 2100 MHz based on fewer client devices 270 registered in network 270 supporting the 2100 MHz frequency and the load for 2100 MHz being high. For example, some client devices 270 may only support 700 MHz and, thus, the 700 MHz should be reserved for these client devices 270. On the other hand, only 20% of devices may support the 2100 MHz. Accordingly, when a client device 270 that supports 2100 MHz connects to operator network 210, control server 264 may determine the client device 270 should use 2100 MHz to free up the other frequencies for other client devices 270.

Control server 264 may generate instructions instructing client device 270 to use 2100 MHz. Control server 264 may transmit the instructions to client device 270 via base station 220. Client device 270 may receive the instructions and switch to using 2100 MHz.

As indicated above, FIG. 6 and FIG. 7 are provided merely as examples. Other examples are possible and may differ from what was described with regard to FIG. 6 and FIG. 7.

Implementations described herein may determine a frequency for client device 270 to use to communicate based on the device type of client device 270 and the device types of other client devices 270 registered in operator network 210. Additionally, or alternatively, the frequency may be determined based on which frequencies client device 270 supports and which frequencies other client devices 270 registered in operator network 210 support.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the term "having" is intended to be an open-ended term. Further, the phrase "based on" is intended to mean "based, at least in part, on" unless explicitly stated otherwise.

What is claimed is:

1. A device, comprising:
one or more processors to:
obtain network information indicating a first amount of client devices, of each of a plurality of device types, registered in an operator network,
the network information indicating, for each of a plurality of frequencies, a second amount of client devices registered in the operator network that support a respective frequency, of the plurality of frequencies, independent of whether client devices connected to the operator network are using the respective frequency;
obtain client device information identifying a client device;
determine a device type of the client device based on the client device information,
the device type being at least one of the plurality of device types;
determine a frequency, of the plurality of frequencies, for the client device to use to communicate with the operator network based on the device type of the client device, the first amount of client devices of each of the plurality of device types registered in the operator network, and the second amount of client devices registered in the operator network that support the frequency,
the client devices registered in the operator network being registered independent of whether the client devices are connected to the operator network; and
provide an instruction to the client device to use the frequency to communicate with the operator network.

2. The device of claim 1, where the network information indicates a quantity of data used by each of the plurality of device types, and
where the one or more processors, when determining the frequency, are further to determine the frequency based on the quantity of data used by each of the plurality of device types.

3. The device of claim 2, where the device type is a first device type that uses a lesser amount of data than a second device type, and
where the one or more processors, when determining the frequency, are further to:
determine the frequency to be a first frequency based on the first frequency having a greater load than a second frequency and based on the first device type using a lesser amount of data than the second device type,
the client device being capable of using the first frequency and the second frequency.

4. The device of claim 1, where the network information indicates how often each of the plurality of device types switch between an active state and an idle state, and
where the one or more processors, when determining the frequency, are further to determine the frequency based on how often each of the plurality of device types switch between the active state and the idle state.

5. The device of claim 4, where the device type is a first device type that switches between the active state and the idle state less often than a second device type, and
where the one or more processors, when determining the frequency, are further to:
determine the frequency to be a first frequency based on the first frequency having a greater load than a second frequency and based on the first device type switching between the active state and the idle state less often than the second device type,
the client device being capable of using the first frequency and the second frequency.

6. The device of claim 1, where the device type indicates at least one of a kind of the client device, a make of the client device, a model of the client device, or an operating system used by the client device.

7. The device of claim 1, where a respective client device is registered in the operator network when a home subscriber server (HSS), included in the operator network, stores information indicating the respective client device is associated with a subscribed plan for accessing the operator network.

8. A computer-readable medium storing instructions, the instructions comprising:
a plurality of instructions that, when executed by a processor of a device, cause the processor to:
obtain network information indicating, for each of a plurality of frequencies, an amount of client devices registered in an operator network that support a respective frequency, of the plurality of frequencies, independent of whether client devices connected to the operator network are using the respective frequency;

obtain client device information identifying a client device;

determine at least one frequency the client device supports based on the client device information,
the at least one frequency being included in the plurality of frequencies;

determine a frequency for the client device to use to communicate with the operator network based on the at least one frequency that the client device supports and the amount of client devices registered in the operator network that support the frequency,
the frequency being included in the at least one frequency that the client device supports,
the client devices registered in the operator network being registered independent of whether the client devices are connected to the operator network; and provide an instruction to the client device to use the frequency to communicate with the operator network.

9. The computer-readable medium of claim 8, where the plurality of instructions, when determining the frequency, further cause the processor to:
determine the frequency to be a first frequency based on the first frequency being supported by fewer client devices than a second frequency,
the client device supporting the first frequency and the second frequency.

10. The computer-readable medium of claim 9, where the first frequency has a higher load than the second frequency.

11. The computer-readable medium of claim 8, where the plurality of instructions further cause the processor to:
obtain load information indicating loads at the plurality of frequencies; and
the plurality of instructions, when determining the frequency, further cause the processor to determine the frequency based on the load information.

12. The computer-readable medium of claim 8, where the plurality of instructions, when determining the frequency, further cause the processor to:
determine the frequency to be a first frequency that has a greater load than a second frequency,
the client device being capable of using the first frequency and the second frequency.

13. The computer-readable medium of claim 8, where the plurality of instructions further cause the processor to:
obtain performance information associated with the client device,
the performance information indicating how the client device performs while communicating using each of the at least one frequency that the client device supports; and
the plurality of instructions, when determining the frequency, further cause the processor to:
determine the frequency based on the performance information.

14. The computer-readable medium of claim 8, where the network information indicates a second amount of client devices, of each of a plurality of device types, registered in the operator network,
the plurality of instructions, when determining the frequency, further cause the processor to:
determine the frequency based on the second amount of client devices of each of the plurality of device types registered in the operator network.

15. A method, comprising:
obtaining, by a device, network information indicating a first amount of client devices, of each of a plurality of device types, registered in an operator network,
the network information indicating, for each of a plurality of frequencies, a second amount of client devices registered in the operator network that support a respective frequency, of the plurality of frequencies, independent of whether client devices connected to the operator network are using the respective frequency;

receiving, by the device, client device information identifying a client device;

determining, by the device, a device type of the client device based on the client device information,
the device type being at least one of the plurality of device types;

determining, by the device, a frequency, of the plurality of frequencies, for the client device to use to connect to a base station in the operator network based on the device type of the client device, the first amount of client devices, of each of the plurality of device types, registered in the operator network, and the second amount of client devices registered in the operator network that support the frequency,
the client devices registered in the operator network being registered independent of whether the client devices are connected to the operator network; and sending, by the device, a message to the client device instructing the client device to use the frequency to connect to the base station in the operator network.

16. The method of claim 15, further comprising:
obtaining signal strength information indicating signal strengths at the plurality of frequencies; and
where determining the frequency includes determining the frequency based on the signal strength information.

17. The method of claim 16, where the signal strength information indicates a first signal strength of a first signal at the frequency from the base station and indicates a second signal strength of a second signal at the frequency from another base station, and
where determining the frequency includes determining the frequency based on the first signal strength and the second signal strength.

18. The method of claim 15, further comprising:
obtaining communication type information indicating a type of communication between the client device and the base station; and
where determining the frequency includes determining the frequency based on the type of communication.

19. The method of claim 18, where the client device is connected to the base station at an initial frequency, and
where determining the frequency includes determining the frequency to be another frequency different than the initial frequency based the type of communication.

20. The method of claim 15, where a respective client device is registered in the operator network when a home subscriber server (HSS), included in the operator network, stores information indicating the respective client device is associated with a subscribed plan for accessing the operator network.

* * * * *